United States Patent [19]

Mitchell et al.

[11] Patent Number: 4,883,446

[45] Date of Patent: Nov. 28, 1989

[54] BELT TENSIONING SYSTEM, TENSIONER AND PARTS THEREFOR AND METHODS OF MAKING THE SAME

[75] Inventors: James L. Mitchell, Springfield, Mo.; Daniel P. Bexten, Columbus, Miss.

[73] Assignee: Dayco Products, Inc., Dayton, Ohio

[21] Appl. No.: 323,539

[22] Filed: Mar. 14, 1989

[51] Int. Cl.$^4$ .................................................. F16H 7/12
[52] U.S. Cl. ................................................... 474/133
[58] Field of Search .......................... 474/101, 109–111, 474/113–115, 133–138

[56] References Cited

U.S. PATENT DOCUMENTS

| | | | |
|---|---|---|---|
| 4,573,952 | 3/1986 | Schulze | 474/133 X |
| 4,657,524 | 4/1987 | Okabe | 474/133 X |
| 4,702,726 | 10/1987 | Ojima et al. | 474/101 |
| 4,722,720 | 2/1988 | Ojima et al. | 474/101 |
| 4,743,224 | 5/1988 | Yoshikawa et al. | 474/101 |
| 4,743,225 | 5/1988 | Okabe | 474/133 |

*Primary Examiner*—Thuy M. Bui
*Attorney, Agent, or Firm*—Joseph V. Tassone

[57] ABSTRACT

A belt tensioning system, tensioner and parts therefor and methods of making the same are provided, the system comprising a support unit, an endless transmission belt construction carried by the support unit and arranged to move in a certain path, an arm pivotally mounted to the support unit, a pulley rotatably carried by the arm and being in engagement with the belt construction, and an actuator carried by the support unit and having opposed ends, the actuator having a movable piston projecting out of one of the opposed ends thereof and being in engagement with the arm to pivot the arm in a direction to urge the pulley into the belt construction as the piston is extended outwardly from the one end of the actuator, the other of the opposed ends of the actuator being pivotally mounted to the support unit whereby the actuator pivots relative to the support unit as the piston thereof extends and retracts at the one end thereof.

28 Claims, 4 Drawing Sheets

BELT TENSIONING SYSTEM, TENSIONER AND PARTS THEREFOR AND METHODS OF MAKING THE SAME

BACKGROUND OF THE INVENTION

1. Field of the Invention

This invention relates to a new belt tensioning system, to a new tensioner and to new parts therefor as well as to new methods of making the same.

2. Prior Art Statement

It is known to provide a belt tensioning system comprising a support means, an endless transmission belt construction carried by the support means and arranged to move in a certain path, an arm pivotally mounted to the support means, a pulley rotatably carried by the arm and being in engagement with the belt construction, and an actuator carried by the support means and having opposed ends, the actuator having a movable piston projecting out of one of the opposed ends thereof and being in engagement with the arm to pivot the arm in a direction to urge the pulley into the belt construction as the piston is extended outwardly from one of the opposed ends of the actuator. For example, see the Yoshikawa et al, U.S. Pat. No. 4,743,224.

Also see the Ojima et al, U.S. Pat. No. 4,702,726, and the Ojima et al, U.S. Pat. No. 4,722,720, for other belt tensioning systems.

SUMMARY OF THE INVENTION

It is one feature of this invention to provide a new belt tensioner wherein not only is the actuator for the tensioner easy to remove when the actuator is in an extended position thereof, but also the tensioner will compensate for thermal and/or dynamic effects in the tensioner system that utilizes the tensioner of this invention.

In particular, prior known tensioners are difficult to remove for service when the actuator of the tensioner is in an extended position thereof, have limited mobility under dynamic conditions and have been limited to applying a force which has been a function of only the spring rate or less. These prior known devices also have no means to compensate for thermal or dynamic effects in the tensioner system utilizing the same.

For example, during engine start-up, the engine is also usually cold and, therefore, the belt construction of the engine is subject to loosening. When an engine start-up is attempted, the belt slack accumulates and tooth jumping occurs.

However, the tensioner of this invention has a progressive tensioning force that tends to overcome any loosening effects of the belt construction. This feature is provided by forming one of the ends of the actuator with means that pivotally mounts the actuator to its support means so that the actuator can pivot relative to the support means as the piston thereof extends out of the other end of the actuator or retracts into that other end as will be apparent hereinafter.

The means of the actuator of this invention for pivotally mounting the actuator to the support means of the tensioner also readily permits the removal of the actuator in an extended position thereof as will be apparent hereinafter.

Thus, one embodiment of this invention provides a belt tensioning system comprising a support means, an endless transmission belt construction carried by the support means and arranged to move in a certain path, an arm pivotally mounted to the support means, a pulley rotatably carried by the arm and being in engagement with the belt construction, and an actuator carried by the support means and having opposed ends, the actuator having a movable piston projecting out of one of the opposed ends thereof and being in engagement with the arm to pivot the arm in a direction to urge the pulley into the belt construction as the piston is extended outwardly from the one of the opposed ends of the actuator, the other of the opposed ends of the actuator being pivotally mounted to the support means whereby the actuator pivots relative to the support means as the piston thereof extends and retracts at the one end thereof.

Another embodiment of this invention provides a belt tensioner for an endless transmission belt construction arranged to move in a certain path, the tensioner comprising a support means, an arm pivotally mounted to the support means, a pulley rotatably carried by the arm for being disposed in engagement with the belt construction, and an actuator carried by the support means and having opposed ends, the actuator having a movable piston projecting out of one of the opposed ends thereof for being in engagement with the arm to pivot the arm in a direction to urge the pulley into the belt construction as the piston is extended outwardly from he one of the opposed ends of the actuator, the other of the opposed ends of the actuator being pivotally mounted to the support means whereby the actuator pivots relative to the support means as the piston thereof extends and retracts at the one end thereof.

Another embodiment of this invention provides an actuator for a belt tensioner for an endless transmission belt construction arranged to move in a certain path, the tensioner comprising a support means and an arm pivotally mounted to the support means and rotatably carrying a pulley for being disposed in engagement with the belt construction, the actuator having opposed ends and having a movable piston projecting out of one of the opposed ends thereof for being in engagement with the arm to pivot the arm in a direction to urge the pulley into the belt construction as the piston is extended outwardly from the one of the ends of the actuator, the other of the ends of the actuator has means to pivotally mount the actuator to the support means whereby the actuator will be adapted to pivot relative to the support means as the piston extends and retracts at the one end thereof.

Accordingly, it is an object of this invention to provide a new belt tensioning system having one or more of the novel features of this invention as set forth above or hereinafter shown or described.

Another object of this invention is to provide a new method of making such a belt tensioning system, the method of this invention having one or more of the novel features of this invention as set forth above or hereinafter shown or described.

Another object of this invention is to provide a new belt tensioner having one or more of the novel features of this invention as set forth above or hereinafter shown or described.

Another object of this invention is to provide a new method of making such a belt tensioner, the method of this invention having one or more of the novel features of this invention as set forth above or hereinafter shown or described.

Another object of this invention is to provide a new actuator for a belt tensioner, the actuator of this invention having one or more of the novel features of this invention as set forth above or hereinafter shown or described.

Another object of this invention is to provide a new method of making such an actuator, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 9 is a view similar to FIG. 8 and illustrates that the outer bracket of the belt tensioner has been removed and how the extended actuator can then be removed from the remaining bracket means for servicing and the like.

DESCRIPTION OF THE PREFERRED EMBODIMENT

While the various features of this invention are hereinafter illustrated and described as being particularly adapted to provide a belt tensioner for use with an internal combustion engine for a transportation vehicle or the like, it is to be understood that the various features of this invention can be utilized singly or in various combinations thereof to provide a belt tensioner for other types of apparatus as desired.

Therefore, this invention is not to be limited to only the embodiment illustrated in the drawings, because the drawings are merely utilized to illustrate one of the wide variety of uses of this invention.

Figure 1:
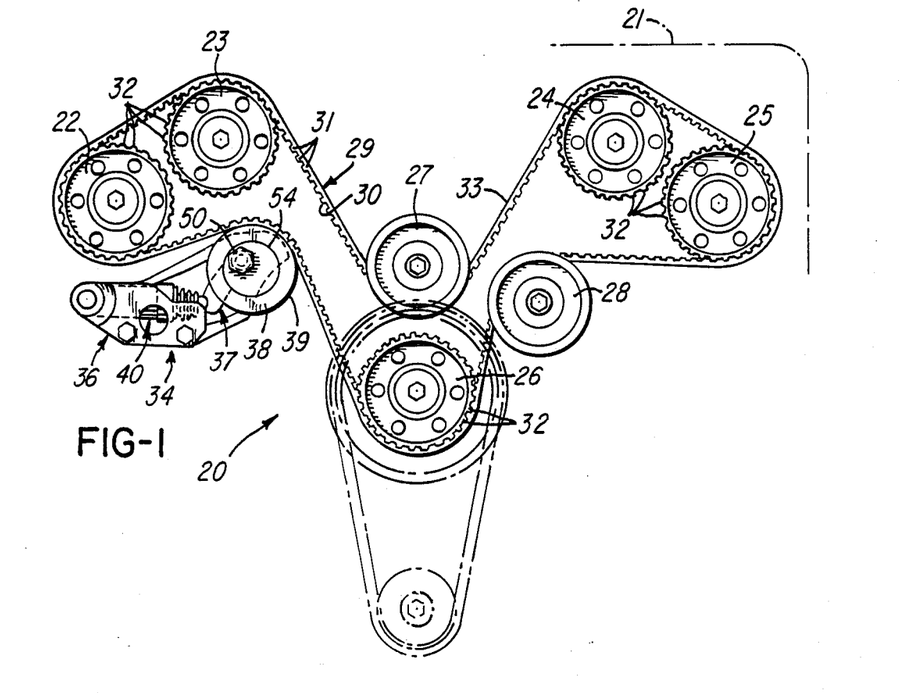
FIG. 1 is a schematic front view of an internal combustion engine of a transportation vehicle having the new belt tensioning of this invention thereon.

Referring now to FIG. 1, the new belt tensioning system of this invention is generally indicated by the reference numeral 20 and is utilized with an internal combustion engine 21 that can be utilized for a transportation vehicle or the like, the belt tensioning system comprising the engine or support means 21 rotatably carrying a plurality of rotatable pulley means 22, 23, 24, 25, 26, 27 and 28. An endless transmission belt construction 29 is trained about the pulleys 22–28 in the manner illustrated in FIG. 1 to provide a driving relationship in a manner well known in the art. For example, see the aforementioned Ojima et al, U.S. Pat. No. 4,702,726; the Ojima et al, U.S. Pat. No. 4,722,720 and the Yoshikawa et al, U.S. Pat. No. 4,743,224, whereby these three U.S. patents are being incorporated into this disclosure by this reference thereto.

The belt construction 29 as illustrated in FIG. 1 comprises a timing belt construction that has its inner side 30 defining a plurality of teeth 31 that are adapted to mesh with the teeth 32 on the pulleys 22, 23, 24, 25 and 26 in a manner well known in the art. The other side 33 of the belt construction 29 is substantially smooth and provides a driving relation with the non-toothed pulleys 27 and 28 also in a manner well known in the art.

Figure 3:
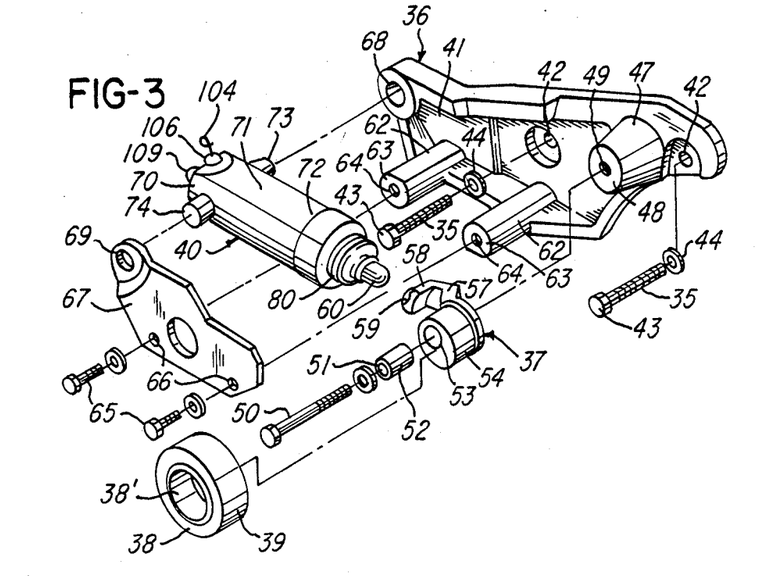
FIG. 3 is an exploded perspective view of the various parts of the belt tensioner of FIG. 2.
Figure 8:
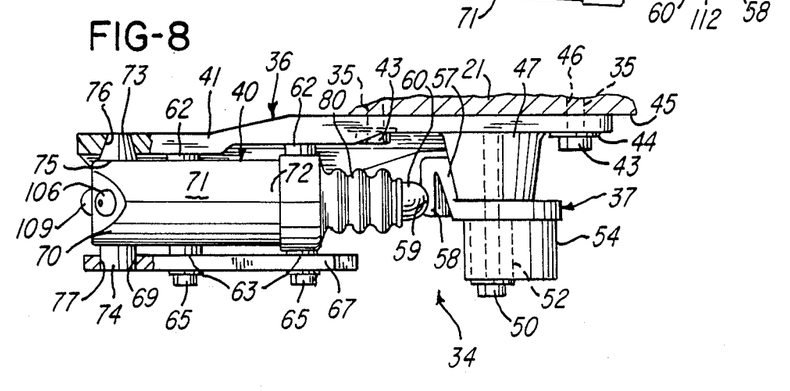
FIG. 8 is a fragmentary cross-sectional view taken on line 8—8 of FIG. 2 and illustrates the pivotally mounting arrangement of the actuator to the bracket means of the belt tensioner of this invention, FIG. 8 having the belt pulley of the belt tensioner removed.
Figure 9:
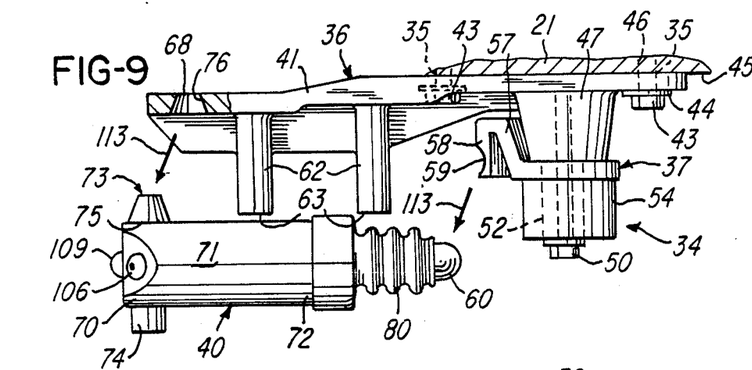

The belt tensioning system 20 of this invention also comprises a belt tensioner of this invention that is generally indicated by the reference numeral 34 and is mounted to the engine or support means 21 by a pair of fastening bolts 35 as illustrated in FIGS. 3, 8 and 9 in a manner hereinafter set forth, the belt tensioner 34 comprising a support means or bracket means 36, an arm 37 pivotally mounted to the support means or bracket means 36, a pulley 38 rotatably carried by the arm 37 to have its outer smooth periphery 39 placed in engagement with the smooth side 33 of the belt construction 29, and an actuator 40 carried by the support means or bracket means 36 in a unique manner as hereinafter set forth.

The actuator 40 of the belt tensioner 34 of this invention is of the spring loaded screw type that applies a tensioning force by urging the pulley 38 in a direction of tensioning engagement with the belt construction 29 for the reasons fully set forth in the aforementioned three U.S. patents whereby only the details of the new belt tensioner 34 of this invention will now be set forth as the operation of such a tensioner in a belt system is well known in the art.

The bracket means 36 of the belt tensioner 34 of this invention comprises a rear bracket or plate 41 that is mounted to the support means 21 by the mounting bolts 35 passing through cooperating openings 42 in the rear mounting plate 41 so that the enlarged heads 43 of the mounting bolts 35 trap the rear bracket 41 between suitable washers 44 and the exterior surface 45 of the engine or support means 21 as illustrated in FIGS. 8 and 9, the mounting bolts 35 threading into suitable internally threaded openings 46 formed in the support means 21 in a manner well known in the art. Of course, the openings 46 can be formed in the actual engine block means of the engine 21 or in any other suitable support structure that is carried by the engine 21, as desired.

Figures 6, 7:
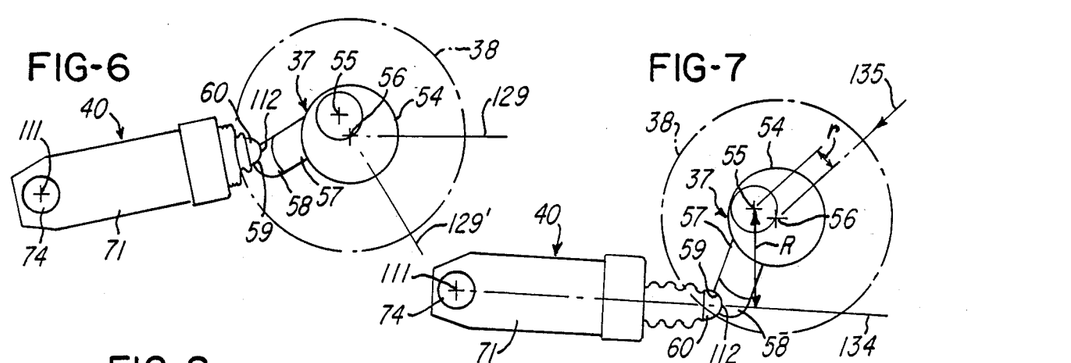
FIG. 6 is a schematic view illustrating the belt tensioner of FIG. 2 with the piston of the actuator thereof in its fully retracted position.
FIG. 7 is a view similar to FIG. 6 and illustrates the tensioner when the actuator has its piston in the fully extended position thereof.

The rear bracket 41 has an enlargement 47 thereon which is provided with a flat end face 48 that is interrupted by an internally threaded opening 49 for receiving a threaded mounting bolt 50 therein, the mounting bolt 50 rotatably mounting the arm 37 to the rear bracket 41 by passing through a suitable opening 51 in a sleeve bearing 52 that is disposed within a cylindrical opening 53 passing through a cylindrical hub 54 of the arm 37 so that the arm 37 is pivotally or rotatably mounted to the enlargement 47 of the rear bracket 41 by the bolt 50 so as to rotate about the center of the bolt 50 or the pivot point or axis 55 thereof as illustrated schematically in FIGS. 6 and 7 for a purpose hereinafter set forth.

Thus, it can be seen that the pivot point or axis 55 of the arm 37 is disposed in offset parallel relation to the center point 56 of the cylindrical hub 54 for a purpose hereinafter described, the cylindrical hub 54 having a bearing means 38' of the pulley 38 press-fitted thereon and held in place by the head of the bolt 50 overlapping the bearing means 38' so that the pulley 38 is rotatably mounted on the hub 54 to rotate about the center point or axis 56 of the hub 54 as schematically illustrated in FIGS. 6 and 7 for a purpose hereinafter set forth.

The arm 37 has an extension 57 provided with a free end 58 that has a concave socket 59 formed therein for receiving a hemispherical or ball end 60 of a piston member 61 of the actuator 40 for a purpose hereinafter set forth.

Thus, it can be seen that the arm 37 comprises a one-piece member formed of any suitable material, such as metallic material, as desired.

The rear bracket 41 has two mounting posts 62 extending outwardly therefrom and respectively provided with flat free ends 63 having internally threaded openings 64 interrupting the same for respectively receiving threaded mounting bolts 65 that are adapted to pass through suitably aligned openings 66 in a front bracket or plate 67 of the bracket mean 36 of the tensioner 34 for securing the front bracket 67 to the rear bracket 41 in the manner illustrated in FIG. 8.

The rear bracket 41 of the bracket means 36 of the belt tensioner 34 of this invention is provided with a mounting opening 68 that is disposed in axially aligned relation with a mounting opening 69 formed in the front bracket 67, the mounting openings 68 and 69 being utilized to pivotally mount one end 70 of a cylindrical housing means 71 of the actuator 40 to the bracket means 36 so that the actuator 40 is pivotally mounted to the support means or bracket means 36 for a purpose hereinafter set forth, the housing means 71 of the actuator 40 having another end that is open out of which the piston member 61 extends as will be apparent hereinafter.

The housing 71 of the actuator 40 has two projections or trunions 73 and 74 extending outwardly therefrom in axially aligned relation and transverse to the longitudinal axis of the actuator 40 and being shaped to be readily and respectively received in the mounting openings 68 and 69 of the bracket 41 and 67 as illustrated in FIG. 8, the projection 73 having a generally frusto-conical configuration with the larger base 75 thereof being disposed adjacent the housing 71 of the actuator 40 while the mounting opening 68 in the rear bracket 41 defines a generally frusto-conical internal peripheral surface 76 of the bracket member 41 that generally mates with the frustoconical projection 73 in a bearing relationship therewith. In contrast, the other projection 74 of the actuator 40 is substantially cylindrical so as to have a generally same sized circular transverse cross-sectional configuration throughout the length thereof while the opening 69 in the bracket 67 likewise defines a substantially cylindrical internal peripheral surface 77 that mates with and acts in a bearing relationship with the projection 74.

Figure 4:
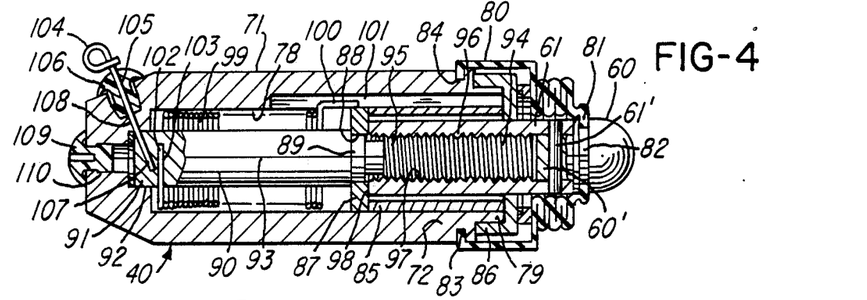
FIG. 4 is an enlarged view of the actuator of the belt tensioner of FIG. 2 and illustrates the actuator in cross section and with the piston thereof in the fully retracted position thereof.
Figure 5:
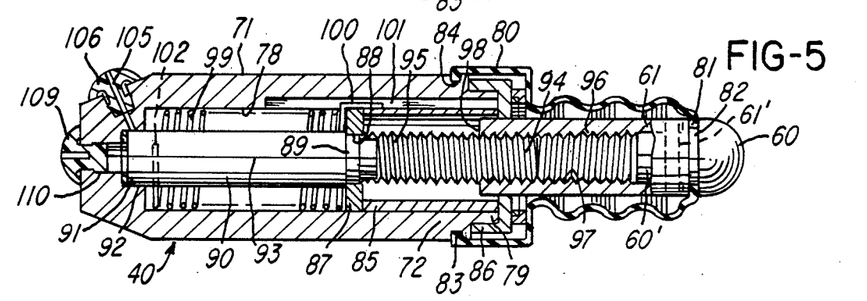
FIG. 5 is a view similar to FIG. 4 and illustrates the piston in its fully extended position.

The actuator 40 of this invention is best illustrated in FIGS. 4 and 5 and it can be seen that the housing means 71 has a chamber 78 therein which leads to an open end 79 of the chamber 78 at the end 72 of the housing means 71 and out of which the end 60 of the piston 61 extends, the open end 79 of the chamber 78 being sealed closed by a flexible boot 80 that has one end 81 received in an annular groove 82 in the piston 61 and an other end 83 received in an annular groove 84 in the end 72 of the housing 71 whereby the boot 61 is adapted to expand outwardly as the piston 61 is extended in the manner illustrated in FIG. 5 and is adapted to collapse in the manner illustrated in FIG. 4 as the piston 61 is retracted into the housing means 71 as will be apparent hereinafter.

A sleeve 85 is fixed in the housing means 71 at the end 72 thereof by a clip means 86 disposed at one end thereof and by a thrust disc or washer 87 at the other end thereof, the sleeve 85 and clip means 86 supporting the piston 61 in a manner to permit the piston 61 to move axially but not rotatably as illustrated in FIGS. 4 and 5. For example, the outer configuration of the sleeve piston 61 can be square or hex-shaped while the clip means 86 and/or sleeve 85 has a similarly shaped opening in which the piston 61 is movably carried.

The trust member 87 has an opening 88 passing therethrough and rotatably supports a section 89 of a rotatable shaft 90 that has one end 91 rotatably supported in a cylindrical section 92 of the housing means 71 so that the shaft 90 is adapted to rotate about its longitudinal axis 93 in a manner hereinafter described. The shaft 90 has the free end 94 thereof provided with external threads 95 that are disposed in meshing relation with internal threads 96 formed in the piston 61 as the piston 61 has a threaded opening 97 interrupting an end 98 thereof.

In this manner, as the shaft 90 is rotated in one direction by the force of a coiled spring 99 unwinding in a manner hereinafter set forth, the threaded relationship between the threads 95 and 97 will cause the piston 61 to axially move to the right in FIGS. 4 and 5 so as to extend outwardly from the housing 71 and exert a force on the arm 37 to urge the pulley 38 into the belt construction 29 as will be apparent hereinafter. Conversely, the belt construction 29, through vibration thereof, will tend to force the piston 61 axially to the left in FIGS. 4 and 5 in opposition to the force of the spring 99 and thereby cause the shaft 90 to rotate in a direction to permit the piston 61 to move to the left and wind up the spring 99 as will be apparent hereinafter.

The spring 99 is coiled in such a manner that when an end 100 of the spring 99 is held fixed in a keyway slot 101 in the housing 71 and the other end 102 of the spring 99 is received in a suitable opening 103 in the shaft 90, the stored coiled energy in the spring 99 tends to rotate the shaft 90 in a direction that will cause the piston 61 to be driven to the right as illustrated in FIGS. 4 and 5 all in a manner well known in the art.

In order to lock the actuator 40 in its fully retracted position as illustrated in FIG. 4, a locking pin 104 is inserted through an opening 105 in a seal cap 106 press-fitted in a suitable opening in the housing means 71 and has its free end 107 received in a suitable opening 108 in the shaft 90 so as to lock the same from rotation as illustrated in FIG. 4. However, when the locking pin 104 is removed as illustrated in FIG. 5, the shaft 90 is free to rotate and the opening 105 in the seal cap 106 can be utilized for venting purposes or the like.

Another seal cap 109 is snap-fittingly disposed in an opening 110 in the end 70 of the housing means 71 as illustrated whereby the chamber 78 is effectively sealed by the seal caps 106, 107 and boot 80 so that a suitable lubricant, such as oil, can be contained in the chamber 78 so as to provide lubrication for the threaded action of the threads 95 and 97 on the shaft 90 and in the piston 61 as is well known in the art. Of course, other lubrication means can be provided for the threads 95 and 97 other than oil, such as any suitable coatings or the like, as desired.

While the various parts of the belt tensioner 34 of this invention can be formed of any suitable material in any suitable manner, well known means can be utilized to overcome any compatibility problems. For example, suitable linings can be provided in the mounting openings 68 and 69 to prevent galling of the material of the trunions 73 and 74 by the material of the brackets 41 and 67.

Also, while the piston 61 can be a one-piece member, the same can comprise a ball 60 that has a tail 60' that is pinned to the sleeve 61 by a pin 61' as illustrated in FIG. 4.

In addition, while the belt tensioner 34 of this invention can be mounted as a self-contained unit to the engine 21 and then have the pin 104 removed to spring load the pulley 38 by the actuator 40, it is to be understood that the tensioner 34 can be assembled in parts to the engine 21 by first mounting the rear bracket 41 thereto and then assembling the arm 37 and actuator to the rear bracket 41. Thereafter, the pulley 38 and front bracket 67 can be assembled thereto and the locking pin 104 removed to spring load the belt construction 29 as previously set forth.

From the above, it can be seen that the belt tensioner 34 of this invention can be readily formed of the various parts previously described by the method of this invention to operate in a manner now to be described.

Figure 2:
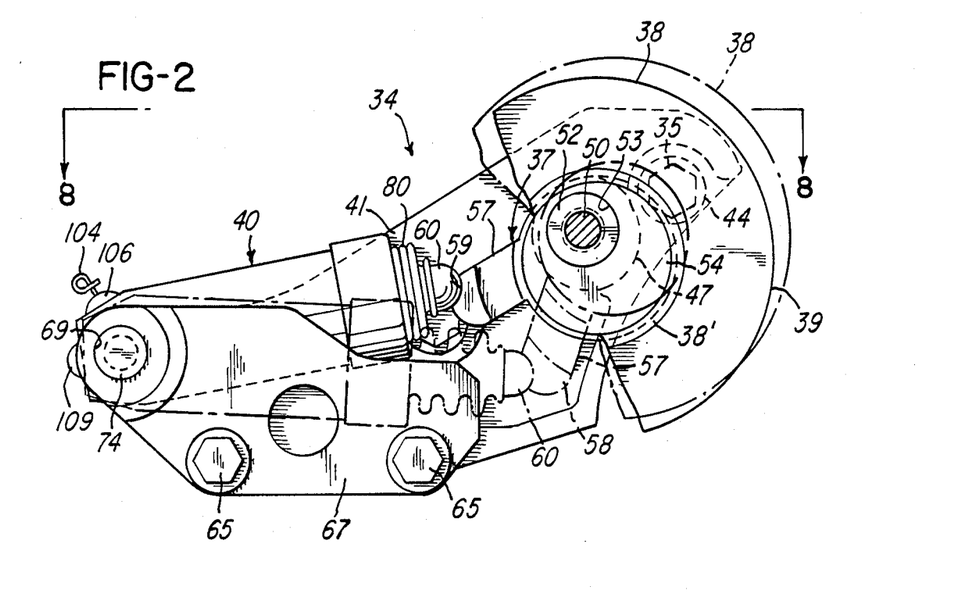
FIG. 2 is an enlarged, fragmentary and partially broken away view of the belt tensioner of this invention that is utilized in the system of FIG. 1.

With the belt tensioner 34 disposed in the position illustrated in full lines in FIG. 2 and as schematically illustrated in FIG. 6 and with the locking pin 104 removed, it can be seen that the spring 99 tends to rotate the shaft 90 in a direction to cause the piston 61 to extend to the right in the drawings and thereby act against the ar 37 to tend to cause the arm 37 to rotate in a counterclockwise direction about its fixed pivot point 55 and thereby cause the rotational axis 56 of the pulley 38 to orbit in a counterclockwise direction about the axis 55 as illustrated in FIGS. 6 and 7 so as to move the pulley 38 in a direction that will apply a tensioning force on the belt construction 29 as represented by the phantom lines of the pulley 38 in FIG. 2. As the piston 61 is extended outwardly from the housing 71 by the spring 99 in the manner previously set forth, it can be seen that the free end 58 of the arm 37 is moving downwardly in the drawings and thereby requires the actuator 40 to pivot on its pivot axis that is indicated by the reference numeral 111 in FIGS. 6 and 7 and defined by the axis that passes through the aligned trunions 73 and 74 of the actuator 40 as previously set forth.

Thus, it can be seen that the pivot points or axes of rotation 55 and 111 respectively for the arm 37 and actuator 40 are fixed pivot points whereas the axis 56 of rotation of the pulley 38 and the point 112 in FIGS. 6 and 7 where the ball end 60 of the piston 61 of the actuator is disposed in the socket 59 of the arm 37 are pivot points that move during the operation of the tensioner 34 and create a unique relationship which will be hereinafter set forth.

However, a vibration of the belt construction 29 occurs during the operation of the engine 21 that moves the belt construction 29 in a continuous endless path as determined by the pulleys 22-28, as well as by the pulley 38 of the tensioner 34 and such vibration and force of the belt construction 29 tends to axially move the piston 61 back into the housing 71 of the actuator 40 and wind up the spring 99 thereof whereby the tensioning force provided by the belt tensioner 34 of this invention is uniquely applied to the belt construction 29 in a manner hereinafter set forth.

Should it be desired to remove an actuator 40 of this invention from the tensioner 34 while the tensioner 34 is installed on the engine 21 and the piston 61 is in an extended position thereof and providing a tensioning force on the belt construction 29, the front plate or bracket means 67 is removed in the manner illustrated in FIG. 9 and then the actuator 40 can be grasped and moved outwardly and to the left as represented by the arrows 113 in FIG. 9 by a person as such movement is permitted by the angle of the frusto-conical projection 73 and bearing surface 76 of the rear bracket 41 and the relatively shallow concave socket 59 and arcuate ball end 60 of the arm 34 and piston member 61 so that the removed actuator 40 can be readily serviced or replaced by a new actuator 40 without requiring the tensioner 34 to be completely unmounted from the engine 21.

In contrast, it is believed that if the projection 73 were a true cylindrical projection similar to the projection 74, such removal of the actuator 40 could not readily take place while the tensioner 34 is still mounted to the engine 21 and is under tensioning force with the belt construction 29 as the leftward movement 113 in FIG. 9 could not be provided for such a removal whereby it is believed that the frusto-conical trunion 73 and its cooperating bearing surface 76 provided a unique relationship for this purpose.

Also, it can be seen that by having the trunions 73 and 74 pivotally mount the end 70 of the actuator 40 to the bracket means 36 to provide the fixed pivot point 111 for the actuator 40 as illustrated in FIGS. 6 and 7, the actuator 40 can pivotally move on its axis 111 as the arm 37 pivotally rotates on its axis 55 during the extension and retraction of the piston member 61 in the manner previously described.

It can be seen from FIGS. 6 and 7 that in one working embodiment of the belt tensioner 34 of this invention, the length from the pivot point 55, which is the center point of the mounting bolt 50 of the arm 37, to the center line 112 of the arm socket 59 is longer than the length from the pivot point 55 to the point 56 which is the center or axis of rotation of the pulley 38 and this fact creates a corresponding multiplying effect of the mounting means to the hub load of the pulley 38. In addition, the angle of this position of the actuator 40 and the angle between the location of the ball socket 59 and the center 56 of the pulley 38 creates a geometrical relationship which is used to produce a compensating effect to the multiplying effect.

Figure 10:
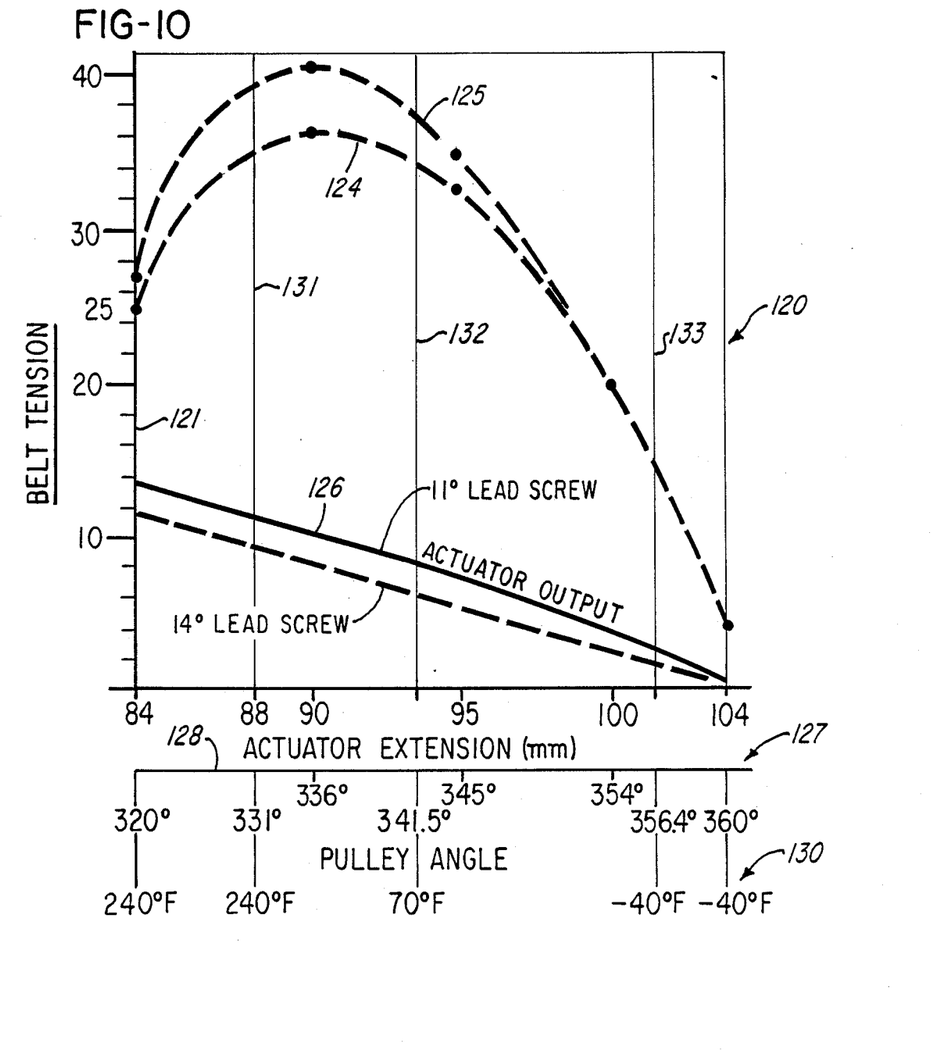
FIG. 10 is a view setting forth three graphs that respectively illustrate the operation of one working embodiment of the belt tensioner of this invention.

In particular, see FIG. 10 wherein the upper graph 120 has its Y axis 121 in pounds of force and its X axis 122 in millimeters whereas the origin point 123 of the X axis 122 of the graph 120 is designated as 84 mm as this length is measured from the pivot point 111 of the actuator 40 to the point 112 on the ball end 60 of the piston 61 in its fully retracted position of FIGS. 4 and 6, the X axis 122 extending to the right to point of approximately 104 mm wherein the piston 61 is in its fully extended condition as illustrated in FIGS. 5 and 7. Thus, it can be seen that the piston 61 of the actuator extends about 20 mm from its fully retracted position to its fully extended position.

The dashed line 124 on the graph 120 represents the force applied by the pulley 38 of the belt tensioner 34 to the belt construction 29 when the pulleys 22-25 each have 24 teeth and the belt construction 29 is compatible therewith whereas the dashed line 125 on the graph 120 represents the force applied by the pulley 38 of the belt tnesioner 34 to the belt construction 29 when the pulleys 22-25 have 30 teeth and the belt construction 29 is compatible therewith as is well known in the art.

The line 126 on the graph 120 represents the force provided by the actuator 40 acting against the point 112 on the arm 37 at the various extended positions of the piston 61 thereof when a 11° lead screw thread 95 is used, the dashed line below line 126 indicating the force when a 14° lead screw thread 95 is used.

Arranged below the graph 120 of FIG. 10 is a second graph that is generally indicated by the reference numeral 127 and has on its X axis 128 the degrees of pulley angle provided by the pulley 38 in the various extended positions of the piston 61 of the actuator 40, the pulley angle being measured from a horizontal line 129, FIG. 6, that passes through the center 56 of the pulley 38 and extending in a counterclockwise direction to a line 129' in FIG. 6 which is a line that passes through the axis 55 of the arm 37 and the center 56 of the pulley 38 in that particular position of the pulley 38 whereby such pulley angle for the 24-tooth pulley arrangement is approximately 320° when the piston 61 of the actuator 40 is in its fully retracted position as represented by the graphs 120 and 127 and the pulley angle is approximately 360° when the piston 61 is in its fully extended position as illustrated by the graphs 120 and 127. However, when the 30-tooth pulley arrangement is utilized, the pulley angle when the piston 61 is fully retracted is approximately 300° and the pulley angle when the piston 61 is fully extended is approximately 340°.

Below the graph 127 of FIG. 10 is a third graph that is generally indicated by the reference numeral 130 which represents the operating temperature of the engine 21 as such temperature is imposed upon the belt tensioning system of FIG. 1.

From the three graphs 120, 127 and 128 in their aligned relation of FIG. 10, it can be seen that in the one working embodiment of the belt tensioner 34 of this invention, the belt tensioner 34 allows the belt construction 29 to maintain a nearly constant tension force in the normal operating range of the engine 21 of approximately 70° F. to approximately 240° F. as represented by the line 124 between the lines 131 and 132 while providing a loosening effect a the operating temperature drops to the minimum allowable operating temperature of approximately −40° F. as represented by the line 133.

The actuator means 40 of this invention operates quickly to produce the required tension in the belt construction 29 such that when the engine is started cold, the belt tension is quickly applied and there is no possibility of tooth jumping of the belt construction 29 with the toothed pulleys 22-26. Therefore, the belt tensioner 34 of this invention can provide optimum tension for any drive configuration by changing the length, angle of disposition of the actuator 40 and the angle between the protruding arm means 37 and the pulley mounting center 56 to produce a non-linear tensioning effect to the belt pulley 38. Under steady state operating conditions, the cooperating components in their geometric relationship are provided to produce the optimum tension for long belt life and under start-up conditions and the cooperating components and their geometric relationship produce a semi-lock condition to prevent tooth jumping of the timing belt construction 29.

In particular, a unique lever ratio is provided by the one working embodiment of the belt tensioner 34 of this invention when considering the length of a line R, FIG. 7, that extends perpendicular from the pivot point 55 to a line 134 that passes through the pivot point 111 of the actuator 40 and the point 112 and the length of a line r, FIG. 7, that extends perpendicular from the pivot point 55 to the hub load force line 135 which extends from a point that is approximately the mid-point of the length of the part of the belt construction 29 that makes contact against the outer periphery 39 of the belt pulley 38, to the axis 56 of rotation of the belt pulley 38. This lever ratio of R/r changes as the length between the points 111 and 112 changes. For example, when the length L between the points is approximately 84 mm for the fully retracted piston 61 of the actuator, R equals approximately 11.5 mm and r equals approximately 9.5 mm.

Thus, when L=90, R=26.6 and r=10; when L=95, R=33 and r=9.95; when L=100, R=37 and r=9.65, and when L=104, R=39 and r=9.3.

However, it is to be understood that the above lever ratio figures are merely given for one working embodiment of the belt tensioner 34 of this invention and are not to be a limitation on this invention as other sizes of the actuator arm 37 can be provided within the teachings of this invention.

Therefore, it can be seen that this invention not only provides a new belt tensioning system and a new belt tensioner and actuator therefor but also this invention provides new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a belt tensioning system comprising a support means, an endless transmission belt construction carried by said support means and arranged to move in a certain path, an arm pivotally mounted to said support means, a pulley rotatably carried by said arm and being in engagement with said belt construction, and an actuator carried by said support means and having opposed ends, said actuator having a movable piston projecting out of one of said opposed ends thereof and being in engagement with said arm to pivot said arm in a direction to urge said pulley into said belt construction as said piston is extended outwardly from said one of said opposed ends of said actuator, the improvement wherein the other of said opposed ends of said actuator is pivotally mounted to said support means whereby said actuator pivots relative to said support means as said piston thereof extends and retracts at said one end thereof.

2. A system as set forth in claim 1 wherein said support means comprises bracket means carried by said support means and having two spaced apart and aligned opening means, said actuator having two opposed and aligned pivot projections respectively received in said two opening means to pivotally mount said actuator to said support means.

3. A system as set forth in claim 2 wherein one of said pivot projections is cylindrical and has substantially the same circular transverse cross-sectional configuration throughout the axial length thereof.

4. A system as set forth in claim 3 wherein said one of said opening means of said bracket means defines a substantially mating bearing surface for said one of said pivot projections.

5. A system as set forth in claim 2 wherein one of said pivot projections is substantially frusto-conical and has the larger base thereof adjacent said actuator.

6. A system as set forth in claim 5 wherein said one of said opening means of said bracket means defines a substantially mating bearing surface for said one of said pivot projections.

7. A system as set forth in claim 6 wherein said bracket means comprises two parts detachably secured together, each said part having one of said opening means therein.

8. A system as set forth in claim 2 wherein said arm is pivotally carried by said bracket means.

9. A system as set forth in claim 1 wherein said piston has a free end that engages said arm, said free end being substantially hemispherical in configuration.

10. A system as set forth in claim 9 wherein said arm has a concave socket that receives said free end of said piston therein.

11. In a belt tensioner for an endless transmission belt construction arranged to move in a certain path, said tensioner comprising a support means, an arm pivotally mounted to said support means, a pulley rotatably carried by said arm for being disposed in engagement with said belt construction, and an actuator carried by said support means and having opposed ends, said actuator having a movable piston projecting out of one of said opposed ends thereof for being in engagement with said arm to pivot said arm in a direction to urge said pulley into said belt construction as said piston is extended outwardly from said one of said opposed ends of said actuator, the improvement wherein the other of said opposed ends of said actuator is pivotally mounted to said support means whereby said actuator pivots relative to said support means as said piston thereof extends and retracts at said one end thereof.

12. A tensioner as set forth in claim 11 wherein said support means comprises bracket means to be carried by said support means and having two spaced apart and aligned opening means, said actuator having two opposed and aligned pivot projections respectively received in said two opening means to pivotally mount said actuator to said bracket means.

13. A tensioner as set forth in claim 12 wherein one of said pivot projections is cylindrical and has substantially the same circular transverse cross-sectional configuration throughout the axial length thereof.

14. A tensioner as set forth in claim 13 wherein said one of said opening means of said bracket means defines a substantially mating bearing surface for said one of said pivot projections.

15. A tensioner as set forth in claim 12 wherein one of said pivot projections is substantially frusto-conical and has the larger base thereof adjacent said actuator.

16. A tensioner as set forth in claim 15 wherein said one of said opening means of said bracket means defines a substantially mating bearing surface for said one of said pivot projections.

17. A tensioner as set forth in claim 16 wherein said bracket means comprises two parts detachably secured together, each said part having one of said opening means therein.

18. A tensioner as set forth in claim 12 wherein said arm is pivotally carried by said bracket means.

19. A tensioner as set forth in claim 11 wherein said piston has a free end that engages said arm, said free end being substantially hemispherical in configuration.

20. A tensioner as set forth in claim 19 wherein said arm has a concave socket that receives said free end of said piston therein.

21. In an actuator for a belt tensioner for an endless transmission belt construction arranged to move in a certain path, said tensioner comprising a support means and an arm pivotally mounted to said support means and rotatably carrying a pulley for being disposed in engagement with said belt construction, said actuator having opposed ends and having a movable piston projecting out of one of said opposed ends thereof for being in engagement with said arm to pivot said arm in a direction to urge said pulley into said belt construction as said piston is extended outwardly from said one of said ends of said actuator, the improvement wherein the other of said ends of said actuator has means to pivotally mount said actuator to said support means whereby said actuator will be adapted to pivot relative to said support means as said piston extends and retracts at said one end thereof.

22. An actuator as set forth in claim 21 wherein said means of said actuator comprise two opposed and aligned pivot projections extending outwardly from said other of said opposed ends of said actuator and being adapted to be received in two spaced apart and aligned opening means to pivotally mount said actuator to said support means 23. An actuator as set forth in claim 22 wherein one of said pivot projections is cylindrical and has substantially the same circular transverse cross-sectional configuration throughout the axial length thereof.

24. An actuator as set forth in claim 22 wherein one of said pivot projections is substantially frusto-conical and has the larger base thereof adjacent said actuator.

25. An actuator as set forth in claim 21 wherein said piston has a free end that is adapted to engage said arm, said free end being substantially hemispherical in configuration.

26. In a method of making a belt tensioner system that comprises a support means, an endless transmission belt construction carried by said support means and arranged to move in a certain path, an arm pivotally mounted to said support means, a pulley rotatably carried by said arm and being in engagement with said belt construction, and an actuator carried by said support means and having opposed ends, said actuator having a movable piston projecting out of one of said opposed ends thereof and being in engagement with said arm to pivot said arm in a direction to urge said pulley into said belt construction as said piston is extended outwardly from said one of said opposed ends of said actuator, the improvement comprising the step of forming the other of said opposed ends of said actuator to have means pivotally mounted to said support means whereby said actuator pivots relative to said support means as said piston thereof extends and retracts at said one end thereof.

27. In a method of making a belt tensioner for an endless transmission belt construction arranged to move in a certain path, said tensioner comprising a support means, an arm pivotally mounted to said support means, a pulley rotatably carried by said arm for being disposed in engagement with said belt construction, and an actuator carried by said support means and having opposed ends, said actuator having a movable piston projecting out of one of said opposed ends thereof for being in engagement with said arm to pivot said arm in a direction to urge said pulley into said belt construction as said piston is extended outwardly from said one of said opposed ends of said actuator, the improvement comprising the step of forming the other of said opposed ends of said actuator to have means pivotally mounted to said support means whereby said actuator pivots relative to said support means as said piston thereof extends and retracts at said one end thereof.

28. In a method of making an actuator for a belt tensioner for an endless transmission belt construction arranged to move in a certain path, said tensioner comprising a support means and a arm pivotally mounted to said support means and rotatably carrying a pulley for being disposed in engagement with said belt construction, said actuator having opposed ends and having a movable piston projecting out of one of said opposed ends thereof for being in engagement with said arm to pivot said arm in a direction to urge said pulley into said belt construction as said piston is extended outwardly from said one of said ends of said actuator, the improvement comprising the step of forming the other of said ends of said actuator to have means to pivotally mount said actuator to said support means whereby said actuator will be adapted to pivot relative to said support means as said piston extends and retracts at said one end thereof.

* * * * *